(12) United States Patent
Duenwald et al.

(10) Patent No.: US 7,703,391 B2
(45) Date of Patent: Apr. 27, 2010

(54) ROUND BALER WITH SCALE AND MOISTURE METER

(75) Inventors: Tom Duenwald, Pella, IA (US); Scott Rempe, Pella, IA (US); Calvin Meinders, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 273 days.

(21) Appl. No.: 11/460,812

(22) Filed: Jul. 28, 2006

(65) Prior Publication Data

US 2009/0217827 A1    Sep. 3, 2009

(51) Int. Cl.
*B30B 13/00* (2006.01)
*B30B 5/04* (2006.01)
(52) U.S. Cl. .............................. 100/35; 100/48; 100/87; 100/88
(58) Field of Classification Search .................. 100/35, 100/40, 48, 50, 87, 88, 89; 56/341
See application file for complete search history.

(56) References Cited

U.S. PATENT DOCUMENTS

| 4,812,741 | A | 3/1989 | Stowell |
| 4,850,271 | A | 7/1989 | White |
| 5,622,104 | A | 4/1997 | Viesselmann |
| 6,378,276 | B1 | 4/2002 | Dorge |
| 6,525,276 | B1 | 2/2003 | Vellidus |
| 6,530,311 | B1 * | 3/2003 | Wilkens et al. ............... 100/40 |

OTHER PUBLICATIONS 15 pages entitled Automatic Data Acquisition on Round Balers by K. Wild, et al—1994.

* cited by examiner

*Primary Examiner*—Jimmy T. Nguyen
(74) *Attorney, Agent, or Firm*—Sturm & Fix LLP

(57) ABSTRACT

A large round baler equipped with moisture sensing apparatus and a bale scale to improve information useful in baling and using bales. Moisture sensing begins after the bale reaches a predetermined diameter. A history of bale weights is used to estimate how much tension to apply to a belt tensioner to achieve both a target bale weight and a target bale size.

13 Claims, 10 Drawing Sheets

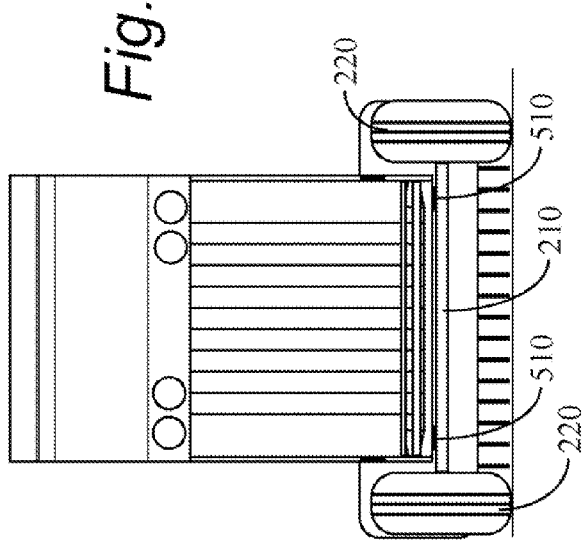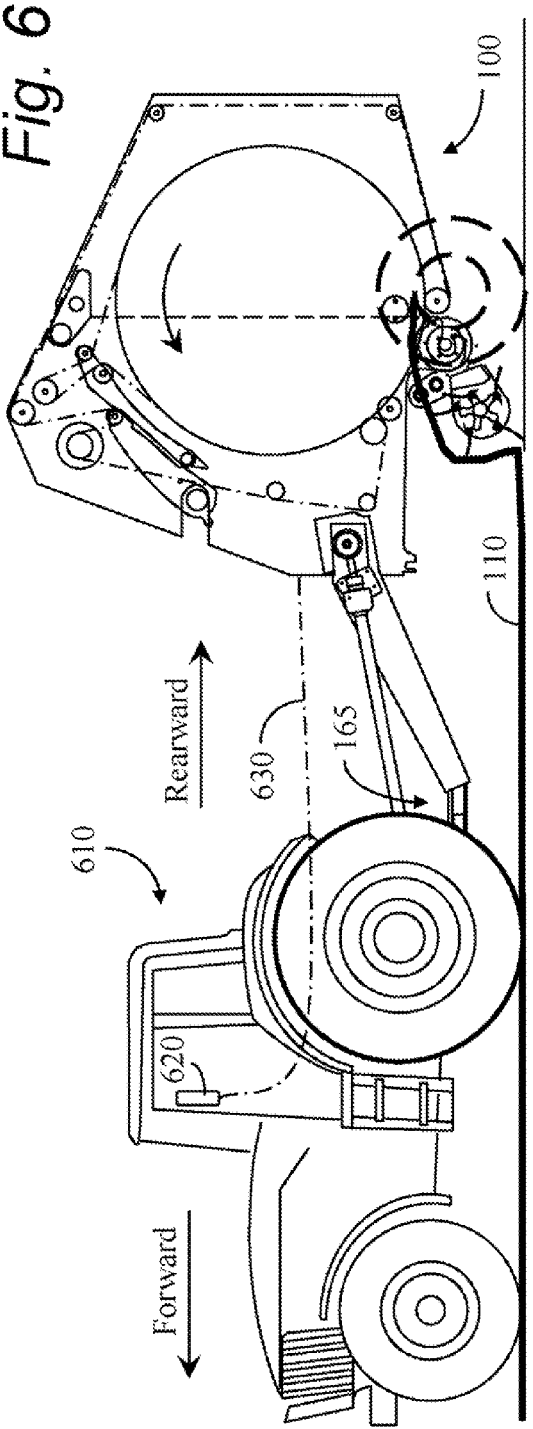

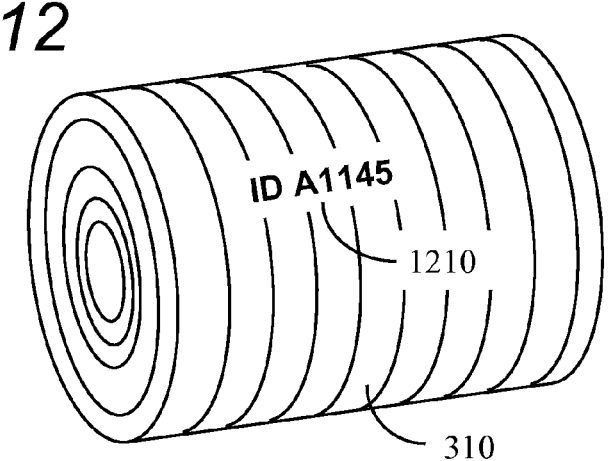
Fig. 12
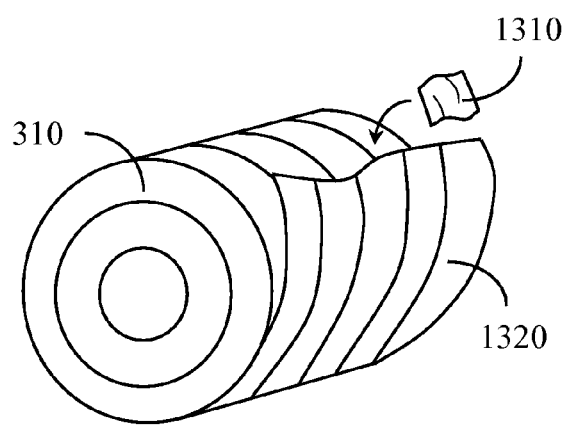
Fig. 13
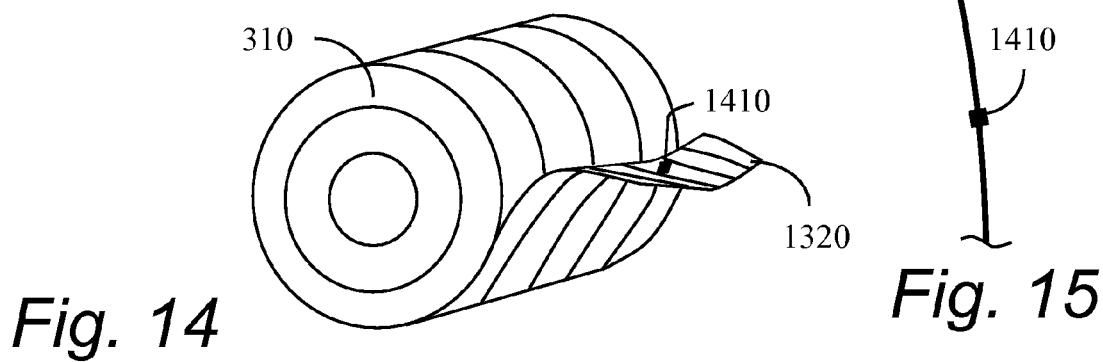
Fig. 14
Fig. 15

Fig: 16

VARIABLE PRESSURE RELIEF VALVE SYSTEM

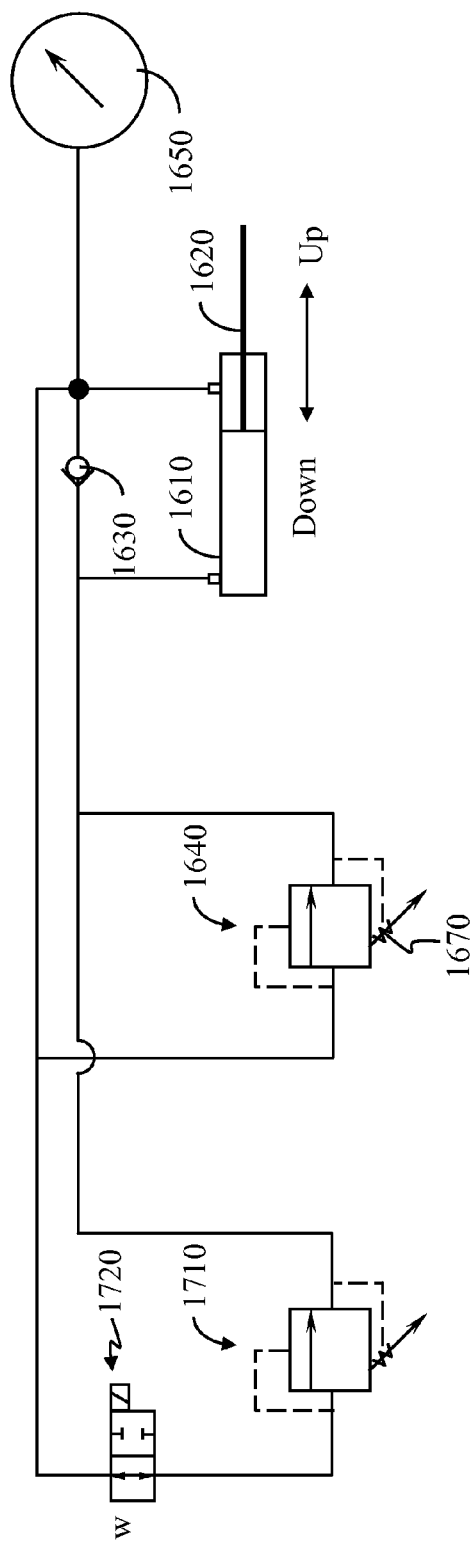
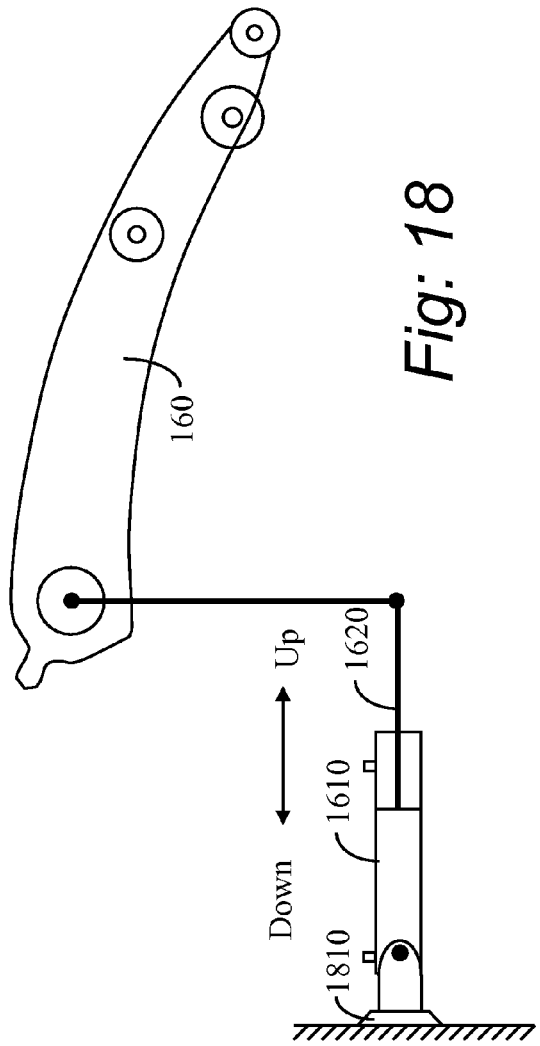
HIGH/LOW RELIEF VALVE SYSTEM WITH SOLENOID ON/OFF FOR LOW PRESSURE VALVE
Fig. 17
Fig. 18

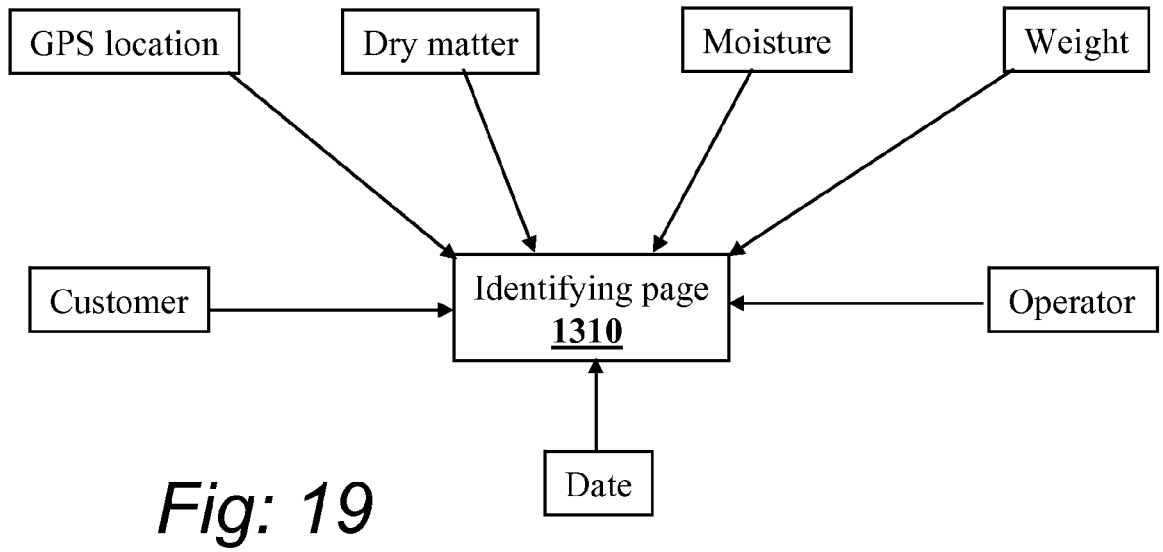
Fig: 19
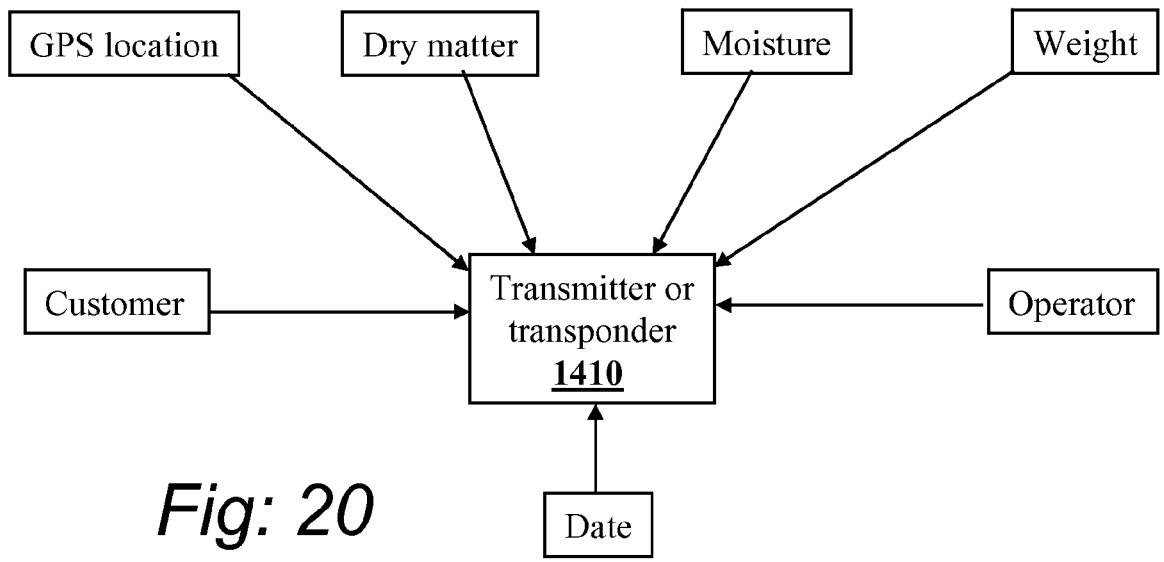
Fig: 20

ROUND BALER WITH SCALE AND MOISTURE METER

TECHNICAL FIELD

The principles disclosed relate to improvements to round balers used for harvest of agricultural crops. The invention relates particularly to a method and apparatus for determining a weight of a bale of hay after it is formed, a moisture content of the bale, projecting a size of a bale at a set point weight, and calculations and data display.

BACKGROUND

Large, cylindrical balers have been on the market for a number of years. Typically, the forming of a bale is terminated according to a diameter criterion. Depending on the crop and its moisture level, the weight of bales and the dry matter content can vary widely, even in the same field.

A variety of sensors are incorporated into a large, cylindrical bale baler in U.S. Pat. No. 5,622,104. In particular, the use of a bale size sensor is disclosed. Additional sensors are suggested for bale RPM, crop moisture, horsepower demands, belt tension, and bale weight.

Wild et al. reported a hay yield monitoring system for round balers with strain gages on the tongue and axle of the vehicles, which provided a measure of the weight of the baler and the bale. They also added accelerometers to measure vertical accelerations during operation and determined stationary loads within 2% of actual weight. Measurements under dynamic conditions are still under investigation. (Wild, K., H. Auernahammer, J. Rottmeier, 1994, "Automatic Data Acquisition on Round Balers," ASAE Technical Paper No. 94-1582, presented at 1994 ASAE International Meeting, Atlanta, Ga. Dec. 13-16, 15 pp.)

A cylindrical bale baler system was disclosed in U.S. Pat. No. 6,378,276. The system comprises an electronic evaluation unit for processing signals from displacement sensors and a pendulum, transmitting the bale weight to an output unit with which the data are displayed or stored, such as on a yield card. Additionally, a control device may control various baler functions. Further, a moisture sensor for crop material may be connected with the evaluation unit for an automatic conversion to weight of the dry mass of the big round bale.

There is, therefore, a need for a cylindrical baling system providing a volume average of the moisture level, a bale weight for each bale, consistent bale weight and size, and an identification label, ultimately providing bale weight, moisture, baling date, and field location for each bale.

SUMMARY

A general object of the present invention is to provide data for each bale made in a large cylindrical (big round) baling operation for decision making, display, archival, and automatic control.

Parameters sensed by the present invention include bale diameter, bale weight, moisture content, and geographical location.

Moisture measurements will be taken after a bale has reached a predetermined diameter. Readings will be available as volume averaged moisture content of the bale as the bale diameter increased from the predetermined value to the terminal value.

Finished bales will be weighed before ejection from the baler. A history of recent bale weights will be stored and used to adjust future bale densities to achieve desired terminal weights and sizes. To effect varying densities, a variable fluid pressure relief valve is provided to the belt tensioner, thus the resistance of the tensioner arm to rotation away from the bale is variable.

Various forms of identification with which to associate a particular bale with its data are available. A simple alphanumeric ID may be stamped in ink or paint on the bale or wrapping. A printout of an ID and/or bale data on a slip of paper or cardstock may be dropped between the crop material and the binding material. A Radio Frequency (RF) chip or chips may be incorporated in bale wrapping, twine, or simply dropped between the crop material and the wrapper. Other electronic chips may also be used, including transponders. Bale data may be stored on the electronic media, or only an ID, which may be cross referenced in archived data.

An object of this invention is to provide volume-averaged moisture content readings of a bale beginning after a predetermined bale diameter has been achieved. Another object of this invention is to utilize bale size and weight histories to adjust a bale density to achieve both a terminal size and weight. Still another object is to provide an identification system for large round bales after they have been formed.

BRIEF DESCRIPTION OF THE DRAWINGS

FIG. 5 is a rear elevation view of a round baler;

FIG. 6 is a side elevation view of a round baler pulled by an agricultural tractor;

FIG. 12 is a perspective view of a cylindrical bale with an ID marking;

FIG. 13 is a perspective view of a cylindrical bale and an identifying page;

FIG. 14 is a perspective view of a cylindrical bale with a transmitter attached to the bale wrap;

FIG. 15 shows a length of twine bale wrapping material with transmitters attached at intervals;

FIG. 17 is a schematic diagram of a second bale density pressure relief/control system;

FIG. 18 is a schematic diagram of a coupling between the belt tensioner and a hydraulic damper;

FIG. 19 is a flow diagram of information to an identifying page; and

FIG. 20 is a flow diagram of information to a transmitter or transponder.

DETAILED DESCRIPTION

Figure 1:
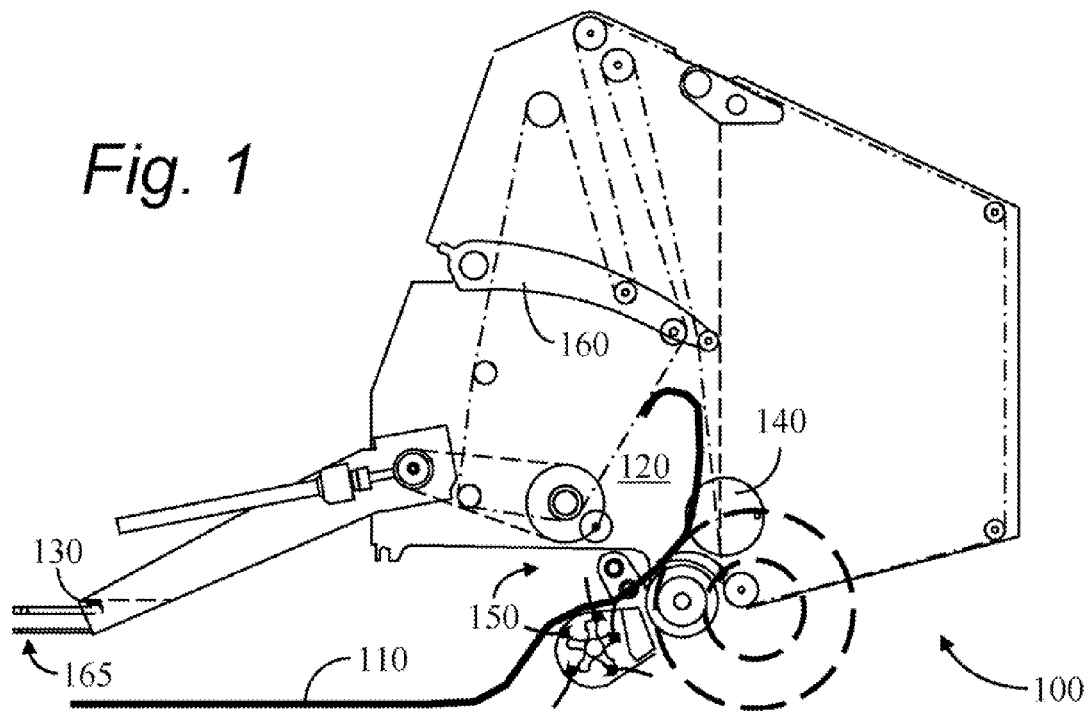
FIG. 1 is a side elevation view of a round baler.

With reference now to the various figures in which identical elements are numbered identically throughout, a description of various exemplary aspects of the present invention will now be provided. The preferred embodiments are shown in the drawings and described with the understanding that the present disclosure is to be considered an exemplification of the invention and is not intended to limit the invention to the embodiments disclosed. Any references, herein, to directions will be determined by facing in the direction of travel of the baler during normal operation.

A cylindrical bale baler 100 is shown in FIGS. 1-6. Crop material 110 feeds into a bale forming chamber 120 where the crop material is rolled into a bale 310. In the preferred embodiment, the baler 100 is outfitted with a tongue load cell 130 and axle load cells 510 at each end of the axle 210. Signals from these load cells are combined to obtain a weight of the bale 310. Additionally, at least one moisture sensor 140 is provided near a crop material inlet 150. The moisture sensor 140 provides a signal proportional to the percentage by mass of water in the incoming crop material 110 as follows:

$$M = \frac{\text{Mass of water in crop material}}{\text{Total mass of crop material}}$$

Figure 3:
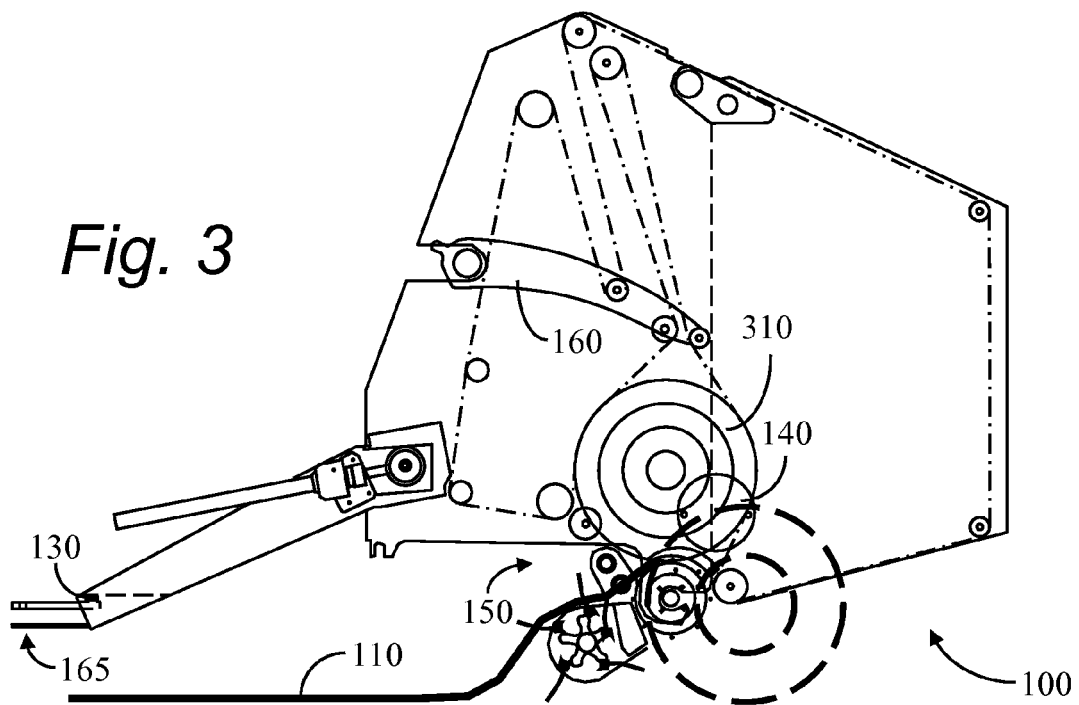
FIG. 3 is a side elevation view of a round baler with a partially formed bale.
Figure 4:
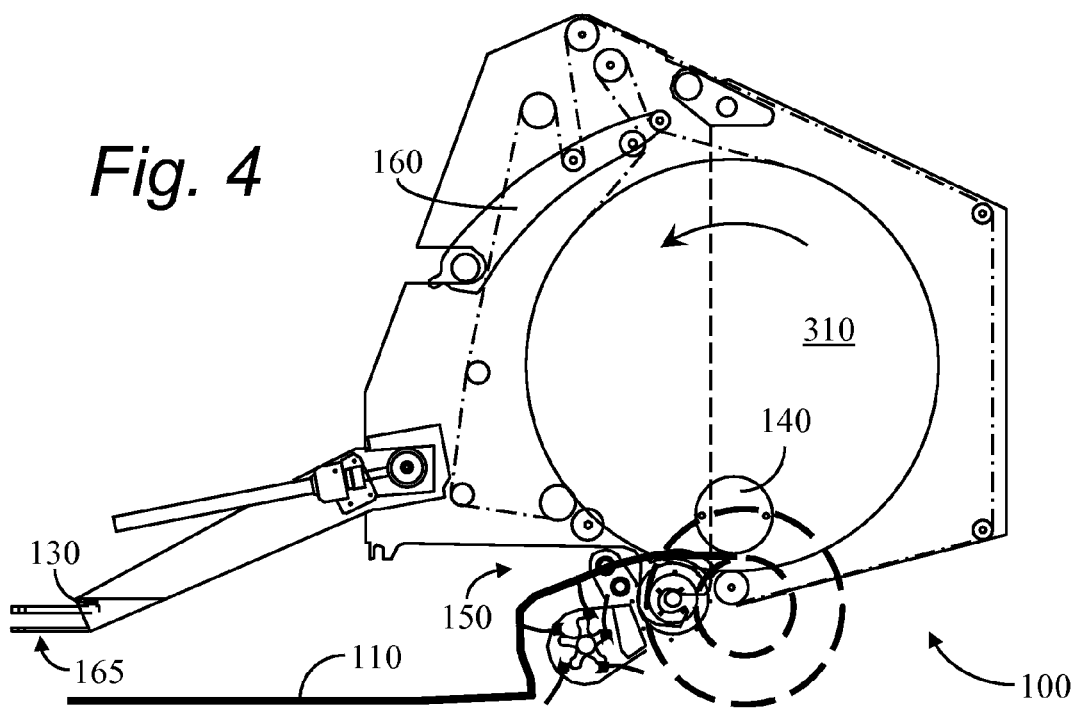
FIG. 4 is a side elevation view of a round baler with a fully formed bale.

In FIGS. 1, 3, and 4, the baler 100 is shown lifting forage material 110, inserting it through the inlet 150, and forming a bale 310. As seen especially in FIGS. 5-6, the baler is supported at three points: by right and left side wheels 220 and by a tongue 165. The load cells 510 engaged to the axle 210 are shown in FIG. 5. The tongue load cell 130 is shown in FIGS. 1, 3, and 4. The load cells are produced by Digistar® as PN 2.125 DA-21 Drawing no 403993. Each load cell 130, 510 will generate a signal that is proportional to the load supported at that point. The generated signal is transferred in any manner to a controller 620. The method of communication illustrated in the present embodiment includes a wire connection via a wiring harness 630. Wireless communication is an alternative. The controller 620 may be mounted on/in the tractor 610 or on the baler 100.

Figure 2:
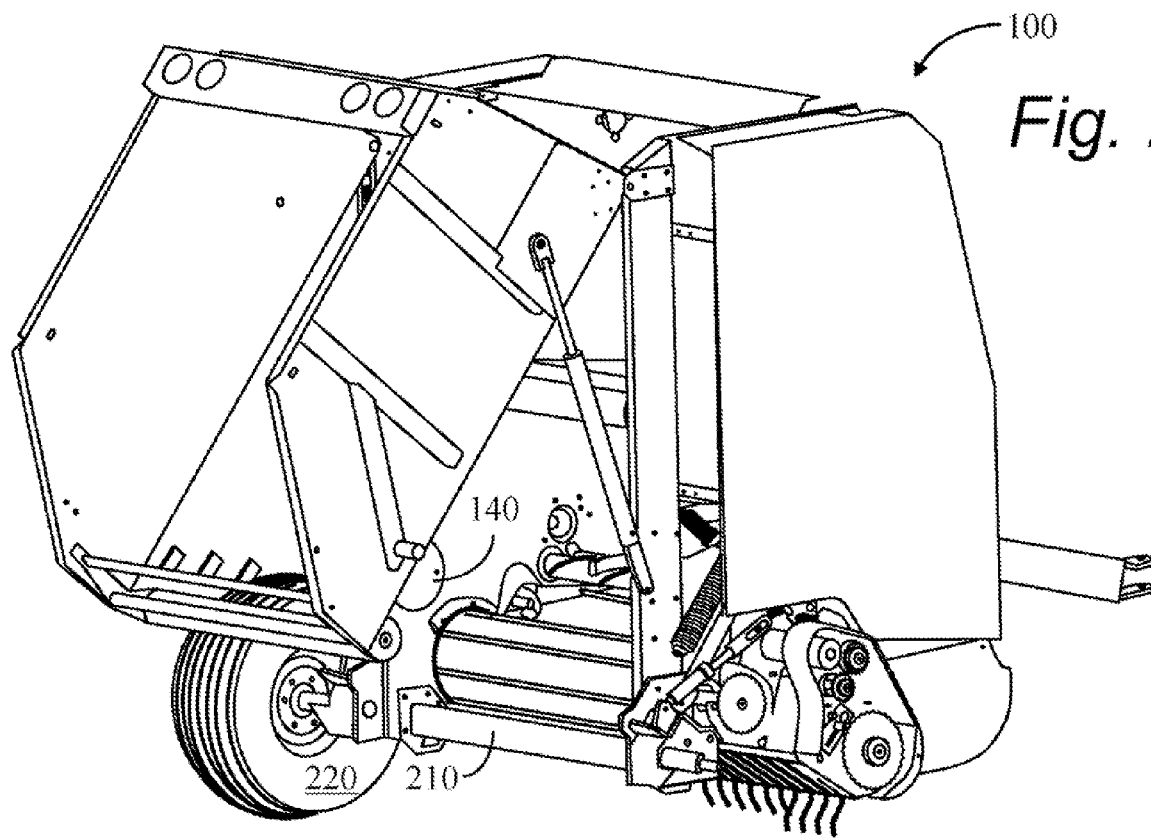
FIG. 2 is a partial isometric view of a round baler.

The large round baler is shown in perspective from the right rear corner in FIG. 2. The moisture sensor 140 is shown from the inside. The right wheel 220 has been removed.

Figure 7:
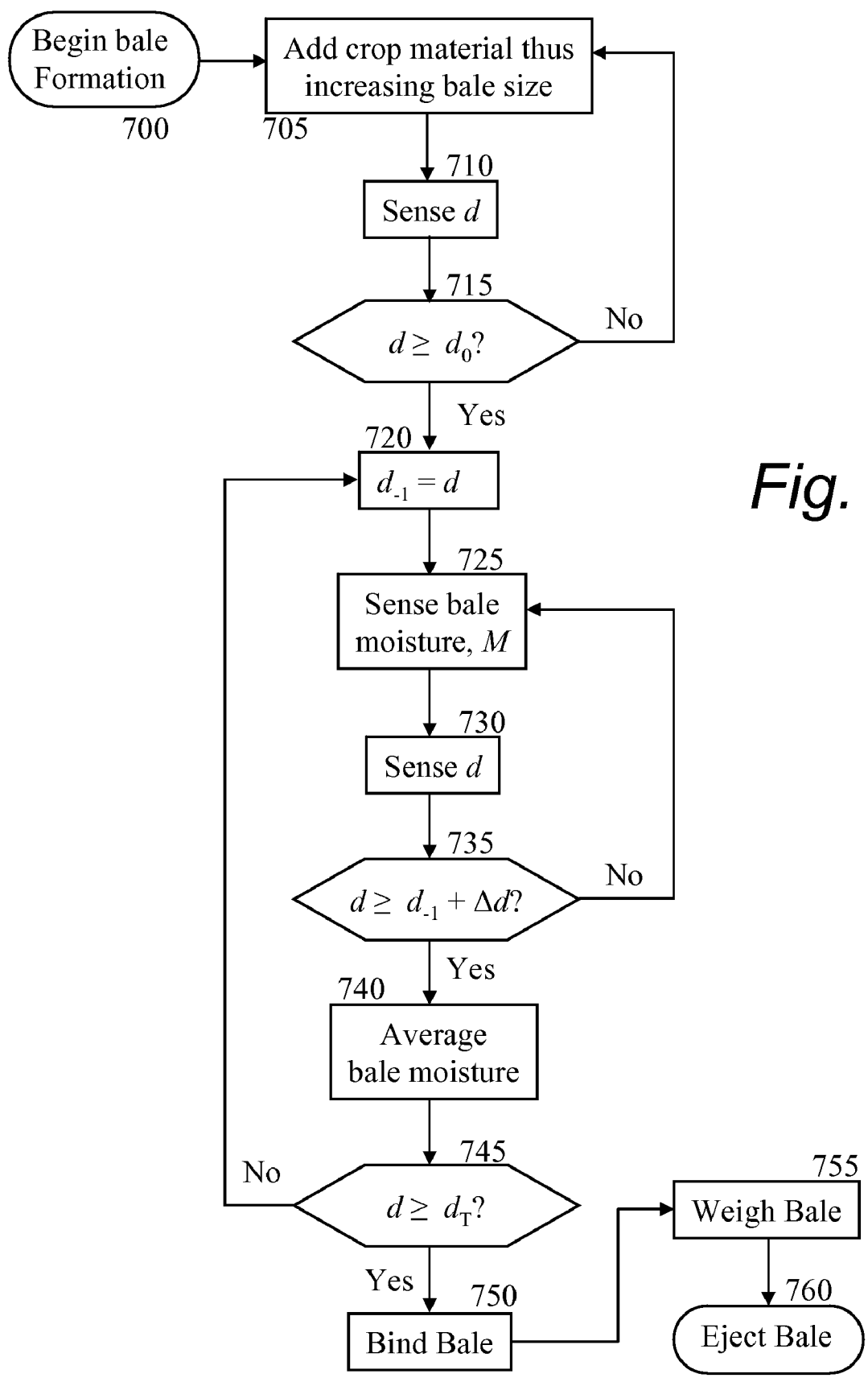
FIG. 7 is a flow diagram of the process of the present invention.
Figure 8:
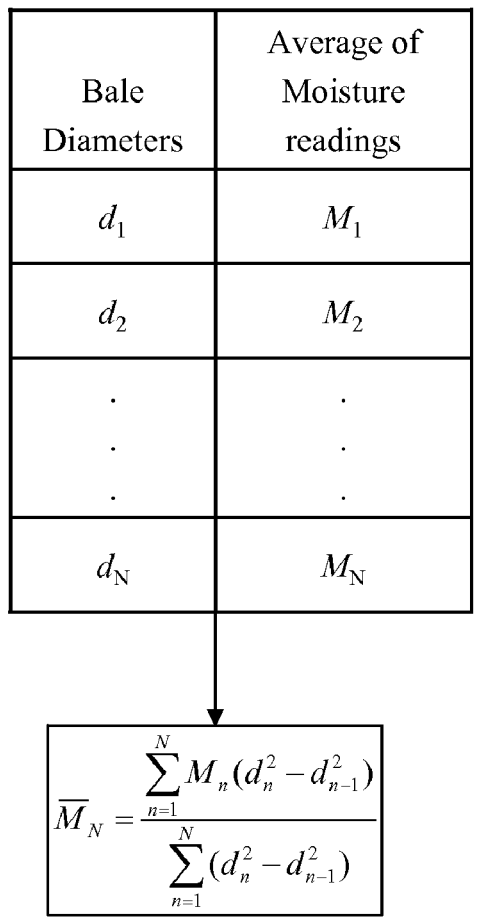
FIG. 8 is a flow diagram of a calculation for determining a volume averaged moisture content.

FIG. 6 illustrates a round baler 100 being towed by a tractor 610 in the normal fashion. A flow diagram of the process of gathering bale data is shown in FIG. 7. The bale 310 begins to form 700 by the introduction of crop material 110 into the baler 100. As crop material 110 continues to be added to the bale 310, the bale size, measured by the diameter, d, increases 705. The baler system senses the diameter, d, 710. The instantaneous diameter, d, is compared to a lower threshold diameter, $d_0$, in a first comparator block 715. If the instantaneous diameter, d, is less than the threshold diameter, $d_0$, the bale is allowed to continue to grow 705. If the instantaneous diameter, d, is greater than or equal to the threshold diameter, $d_0$, the instantaneous diameter, d, is stored in $d_1$ 720 and moisture readings are begun 725. The bale diameter, d, continues to be sensed 730 and at increments of $\Delta d$ 735, the bale moisture content is volume averaged 740 (see FIG. 8). The bale diameter, d, is compared to the terminal diameter, $d_T$ 745, at which addition of crop material 110 is to be terminated. When the bale diameter, d, has reached the terminal diameter, $d_T$, the bale 310 is bound 750, weighed 755, and ejected 760. Binding can be accomplished in any way known in this art such as twine 1510 (see FIG. 15) or netwrap. The present invention is not limited to any particular binding method or material. This process will usually be repeated until all the crop material 110 is baled, or until conditions are such that baling should be terminated, as is well known by those skilled in the art.

Moisture measurement is made possible during baling by the pad 140 on at least one side of a baler as disclosed in U.S. Pat. No. 4,812,741 to Stowell and herein incorporated by reference. FIGS. 1-4 and 6 illustrates one such moisture sensor 140 mounted on the left side panel. In the preferred embodiment, a moisture measurement is received by the controller 620 at intervals in time. As illustrated in the flow diagram of FIG. 8, the moisture content is displayed as a number between zero and one, and is calculated as:

$$\overline{M}_N = \frac{\sum_{n=1}^{N} M_n(d_n^2 - d_{n-1}^2)}{\sum_{n=1}^{N} (d_n^2 - d_{n-1}^2)}$$

where $M_n$ is the $n^{th}$ moisture reading, $d_n$ is the $n^{th}$ diameter, and represents the diameter at the time of the $n^{th}$ moisture reading, $M_n$. The $n^{th}$ moisture reading, $M_n$, may be an average of the moisture readings taken while the bale diameter increased from $d_{n-1}$ to $d_n$, or it may be a single, representative reading taken during the growth of the bale from the diameter, $d_{n-1}$, to the diameter, $d_n$.

Figure 9:
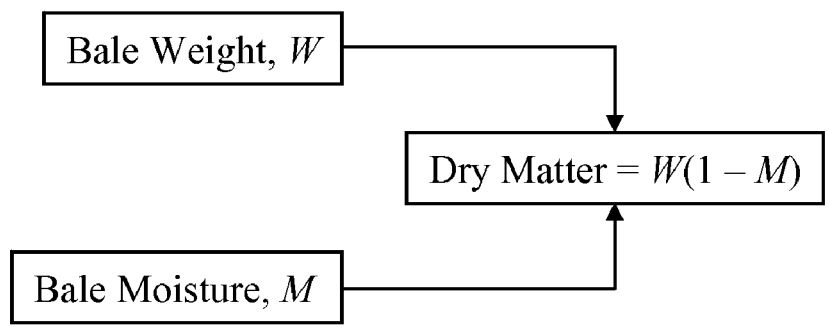
FIG. 9 is a flow diagram of a calculation for determining bale dry matter.

Knowing the moisture content of a finished bale, M, and the weight of the bale, W, the total weight of dry matter of the bale may be calculated as shown in FIG. 9:

Dry Matter $= W(1-M)$

Figure 10:
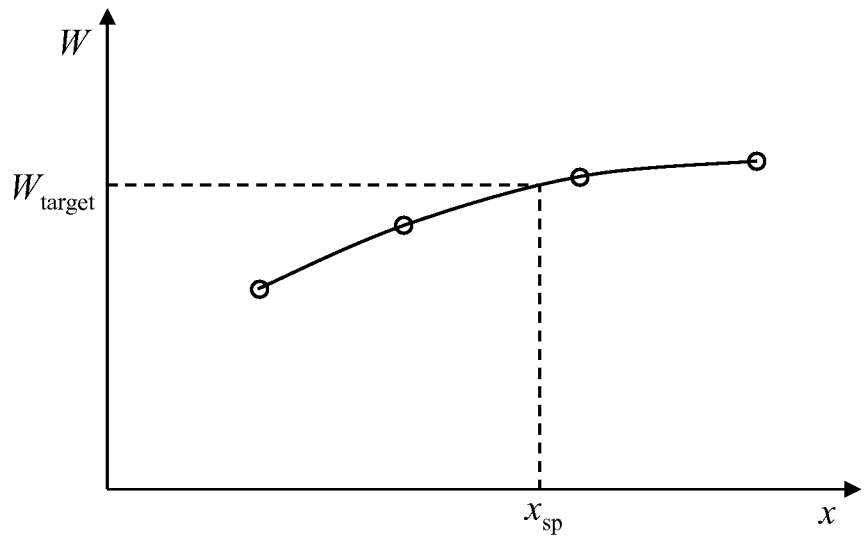
FIG. 10 is a plot of bale weight, W, versus fluid relief value pressure, x.

The plot in FIG. 10 shows a set of bale weights plotted against the associated manipulated variable such as a pressure relief valve setting, frequency of intermittent valve opening, or duration of intermittent valve opening. These data are used in FIG. 11 to determine a new manipulated variable set point, $x_{sp}$, to realize a target bale weight $W_{target}$ in the next bale 310. As more bales are completed and, thus, more data are available, the curve fit is improved. Curve fits are well known in the art and include polynomial fits using linear regression analysis, conventional spline fits, including linear interpolation, and Hermite cubic splines. These and other methods may be found in any of a plethora of numerical analysis textbooks, such as *Applied Numerical Analysis* $2^{nd}$ ed. by Curtis F. Gerald, Addison-Wesley Publishing Company, 1980, herein incorporated by reference.

Figure 11:
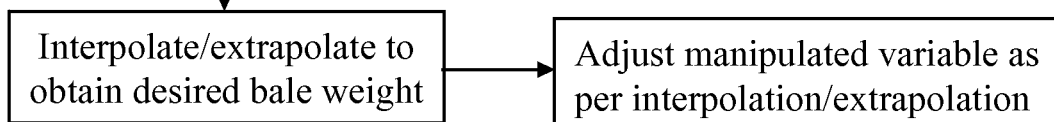
FIG. 11 is a flow diagram showing how bale weight and fluid relief value pressure histories are used to determine a new relief valve pressure set point.

As shown in FIG. 11, the fluid manipulated variable set point, $x_{sp}$, calculated by interpolation or extrapolation from bale histories, is used to adjust the manipulated variable through which hydraulic fluid must pass as the belt tensioner 170 rotates with the growth of the bale 310.

Figure 16:
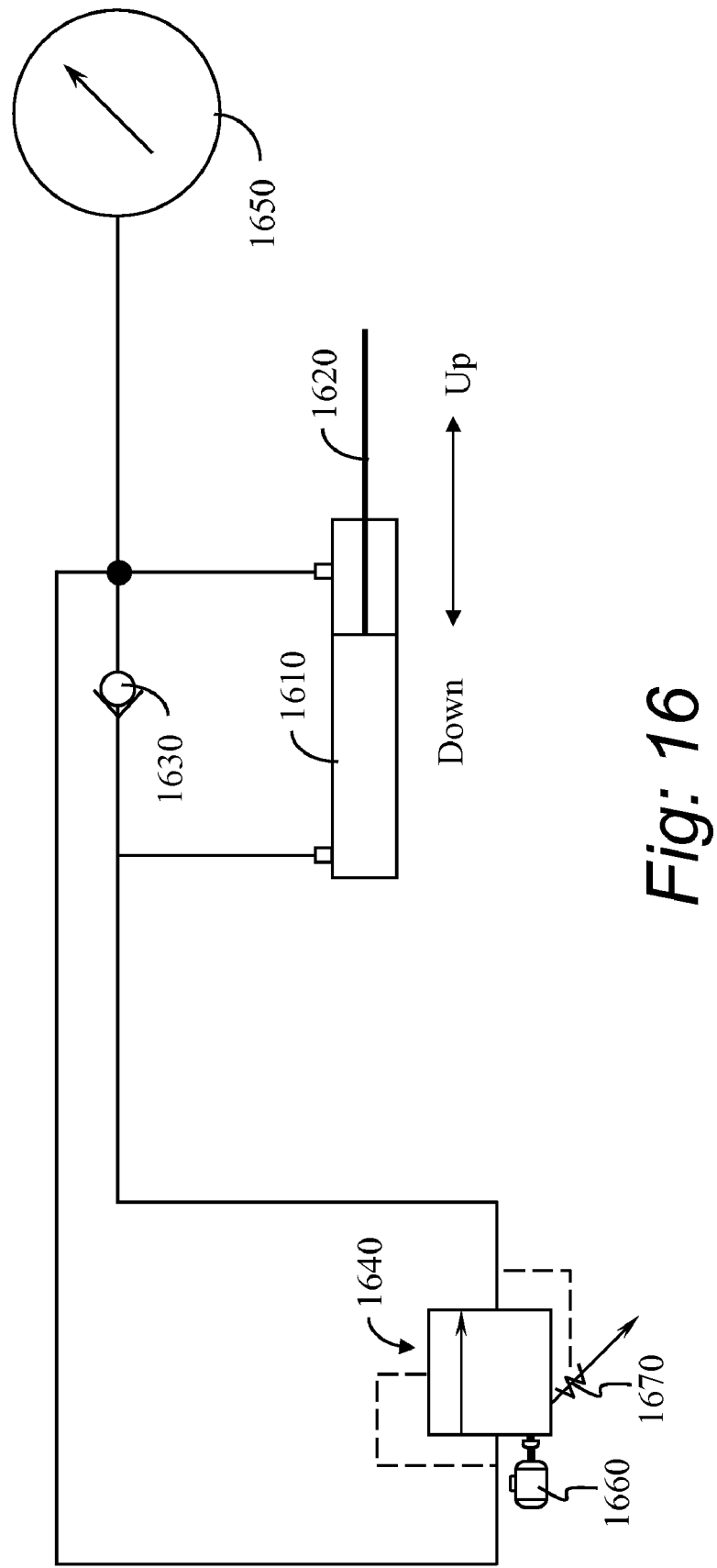
FIG. 16 is a schematic diagram of a first bale density pressure relief/control system.

Systems for varying the resistance to pivoting of the belt tensioner 160 are shown in FIGS. 16 and 17. In FIG. 16, a hydraulic damper 1610 is connected by its shaft 1620 to the belt tensioner 160. When the belt tensioner 160 is lowered, the hydraulic damper 1610 travels in its down direction, and hydraulic fluid passes through a check valve 1630, which provides little resistance to flow. When the belt tensioner 160 is raised, the check valve 1630 disallows flow through itself. Hence, the hydraulic fluid must pass through an adjustable relief valve 1640, by which the pressure at a pressure gage or transducer 1650 is limited at an upper value to the relief valve pressure set point, $x_{sp}$.

Therefore, as the bale 310 grows, the belt tensioner 160 applies a pressure to the hydraulic damper 1610. In order, then, for the belt tensioner to pivot upwardly, the pressure at the pressure gage or transducer 1650 must reach the relief valve pressure set point, $x_{sp}$.

A control system to estimate the pressure relief valve setting to achieve the desired bale density applies the algorithm previously described and illustrated in FIGS. 10 and 11 provides adjustment to the relief valve 1640 by any method and means well known by those of ordinary skill in the art. For instance, a stepper motor 1660 may be used to rotate a spring-force adjustment screw 1670, the spring force ultimately providing the resistance to flow.

A more involved pressure control system is schematically illustrated in FIG. 17. In this embodiment, a second pressure relief valve 1710 is provided. The second pressure relief valve 1710 has a lower set point than the first pressure relief valve 1640, and only affects the flow if a solenoid valve 1720 is open. In this embodiment, the belt tensioner 160 is permitted to rise intermittently by intermittent opening of the solenoid valve 1720. When the solenoid valve 1720 is closed, the pressure at the pressure gage or transducer 1650, is, at most, the value at which the first relief 1640 valve is set. Hence, the density of the bale may be controlled by the frequency and/or duration of the intermittent opening of the solenoid valve 1720, and the relief valves 1640, 1710 do not require adjustability. In this case, the manipulated variable, $x_{sp}$, of FIGS. 10 and 11 is represented by a frequency or duration of opening of the solenoid valve 1720.

An additional embodiment is realized by measuring a value related to the belt tension in place of the manipulated variable, $x_{sp}$. Such values include hydraulic system pressure, as illustrated in FIGS. 16 and 17, or a load cell reading, as depicted in FIG. 18 which shows a load cell 1810 arranged to detect a force between the hydraulic damper 1610 and a mounting surface.

Once moisture and weight data are collected for a given bale 310, the bale may be provided with an identification number, symbol, transponder or transmitter. As shown in FIG. 12, an ID symbol or alphanumeric series 1210 may be painted or inked onto the outside of the bale wrap 1320 (see FIG. 13) on the outside of the bale 310. In FIG. 13, an identifying page 1310 made of paper, cardstock, plastic, fabric, or other material is inserted beneath the bale wrap 1320. Such an identifying page 1310 may include the following data: GPS location, dry matter content, moisture content, weight, customer, operator, and baling date, as depicted in FIG. 19. The identification may be printed to the ID page 1310, or a transmitter or transponder may be attached to the page. A transmitter or transponder 1410 is shown in FIG. 14 attached to the bale wrap. In either of the cases where a transmitter or transponder 1410 is used, the transmitter or transponder 1410 may have the bale data, such as GPS location, dry matter content, moisture content, weight, customer, operator, and baling date, written to it, as depicted in FIG. 20, before the bale 310 is ejected from the baler 100. Alternatively, the transmitter or transponder 1410 may only contain a unique ID that is correlated to the data stored in the baler's control system 620. At a later date, the ID stored on the transmitter or transponder 1410 may be read in the field and the data found in a lookup table on a personal computer, for instance. Note that both netwrap and twine 1510 may be manufactured with transmitters or transponders 1410 preattached or predetermined intervals, as shown in FIG. 15, or the attachment may be done in the baler 100.

With regard to the forgoing description, it is to be understood that changes may be made in detail, especially in matters of the construction materials employed and the size, shape and arrangement of the parts without departing from the scope of the present invention. As used herein, the term "netwrap" is intended to include all sheet-type wrapping materials including tackified plastic materials and untackified plastic materials. The term "bale wrap" as used herein is intended to include sheet-type bale wrapping materials as well as twine. It is intended that these specific and depicted aspects be considered exemplary only, with a true scope and spirit of the invention be indicated by the broad meaning of the following claims.

The invention claimed is:

1. A method of achieving a desired bale weight using a large round baler producing cylindrical bales and having a belt tensioner with a variable tension, the method comprising:
   (a) selecting a target bale weight;
   (b) completing a plurality of cylindrical bales;
   (c) weighing each of said plurality of cylindrical bales after completing each of the plurality of cylindrical bales;
   (d) storing weights of the plurality of cylindrical bales;
   (e) tensioning the belt tensioner for each of the plurality of cylindrical bales;
   (f) storing a value related to the tension of the belt tensioner for each of the plurality of cylindrical bales;
   (g) utilizing the stored weights of the plurality of cylindrical bales and a plurality of the stored values related to the tension of the belt tensioner for each of the plurality of cylindrical bales to estimate a new tension of the belt tensioner to achieve the target bale weight;
   (h) adjusting the tension of the belt tensioner to the estimated new tension; and
   (i) completing an additional cylindrical bale.

2. The method of claim 1 wherein tensioning the belt tensioner of part (e) comprises adjusting a variable pressure relief valve.

3. The method of claim 1 wherein utilizing the stored weights and the plurality of the stored values related to the tension of the belt tensioner of part (g) comprises interpolation.

4. The method of claim 1 wherein utilizing the stored weights and the plurality of the stored values related to the tension of the belt tensioner of part (g) comprises extrapolation.

5. An apparatus for achieving a target bale weight using a large round baler producing cylindrical bales, the apparatus comprising:
   (a) a large round baler;
   (b) a scale to sense a weight of each of a plurality of completed cylindrical bales;
   (c) a first memory in which to store the weights of the plurality of cylindrical bales;
   (d) a belt tensioner, a tension of which varies a density of the cylindrical bale;
   (e) a second memory in which to store the belt tensioner tensions for each of the plurality of completed cylindrical bales;
   (f) a calculation module for estimating a new belt tensioner tension to achieve the target bale weight by utilizing the stored weights of the plurality of cylindrical bales and the stored belt tensioner tensions for each of the plurality of cylindrical bales;
   (h) an actuator for adjusting the belt tensioner tension to the estimated new belt tensioner tension.

6. The apparatus of claim 5 wherein the belt tensioner tension is adjusted by varying a variable pressure relief valve setting.

7. The method of claim 1 wherein tensioning the belt tensioner of part (e) comprises intermittently opening a solenoid valve which allows fluid to pass through a pressure relief valve.

8. The apparatus of claim 5 wherein the belt tensioner comprises:
(a) a hydraulic damper;
(b) an adjustable relief valve connected fluidly in parallel to the hydraulic damper such that, when a pressure reaches a pressure set point, the adjustable relief valve permits fluid to pass from a first port of the hydraulic damper to a second port of the hydraulic damper; and
(c) a check valve connected fluidly in parallel to the hydraulic damper and the adjustable relief valve such that fluid may pass from the second port of the hydraulic damper to the first port of the hydraulic damper through the check valve.

9. The apparatus of claim 5 wherein the belt tensioner comprises:
(a) a hydraulic damper;
(b) a check valve connected fluidly in parallel to the hydraulic damper such that fluid may pass from a second port of the hydraulic damper to a first port of the hydraulic damper through the check valve;
(c) a first relief valve connected fluidly in parallel to the hydraulic damper such that, when a pressure reaches a pressure set point, the first relief valve permits fluid to pass from a first port of the hydraulic damper to a second port of the hydraulic damper;
(d) a second relief valve connected fluidly in parallel to the hydraulic damper, said second relief valve having a lower pressure set point than the first relief valve; and
(e) a valve connected fluidly in series with the second relief valve such that, when the valve is open, the second relief valve provides the lower pressure set point to the fluid, and when the valve is closed, the first relief valve provides a higher pressure set point to the fluid.

10. The apparatus of claim 6 wherein a variable pressure relief valve comprises a solenoid valve, opened and closed intermittently during baling.

11. The method of claim 1 wherein storing the value related to the tension of the belt tensioner of part (f) comprises storing a hydraulic pressure reading.

12. The method of claim 1 wherein storing the value related to the tension of the belt tensioner of part (f) comprises storing a load cell reading.

13. The method of claim 1 wherein storing the value related to the tension of the belt tensioner of part (f) comprises storing a relief valve position.

* * * * *